UNITED STATES PATENT OFFICE.

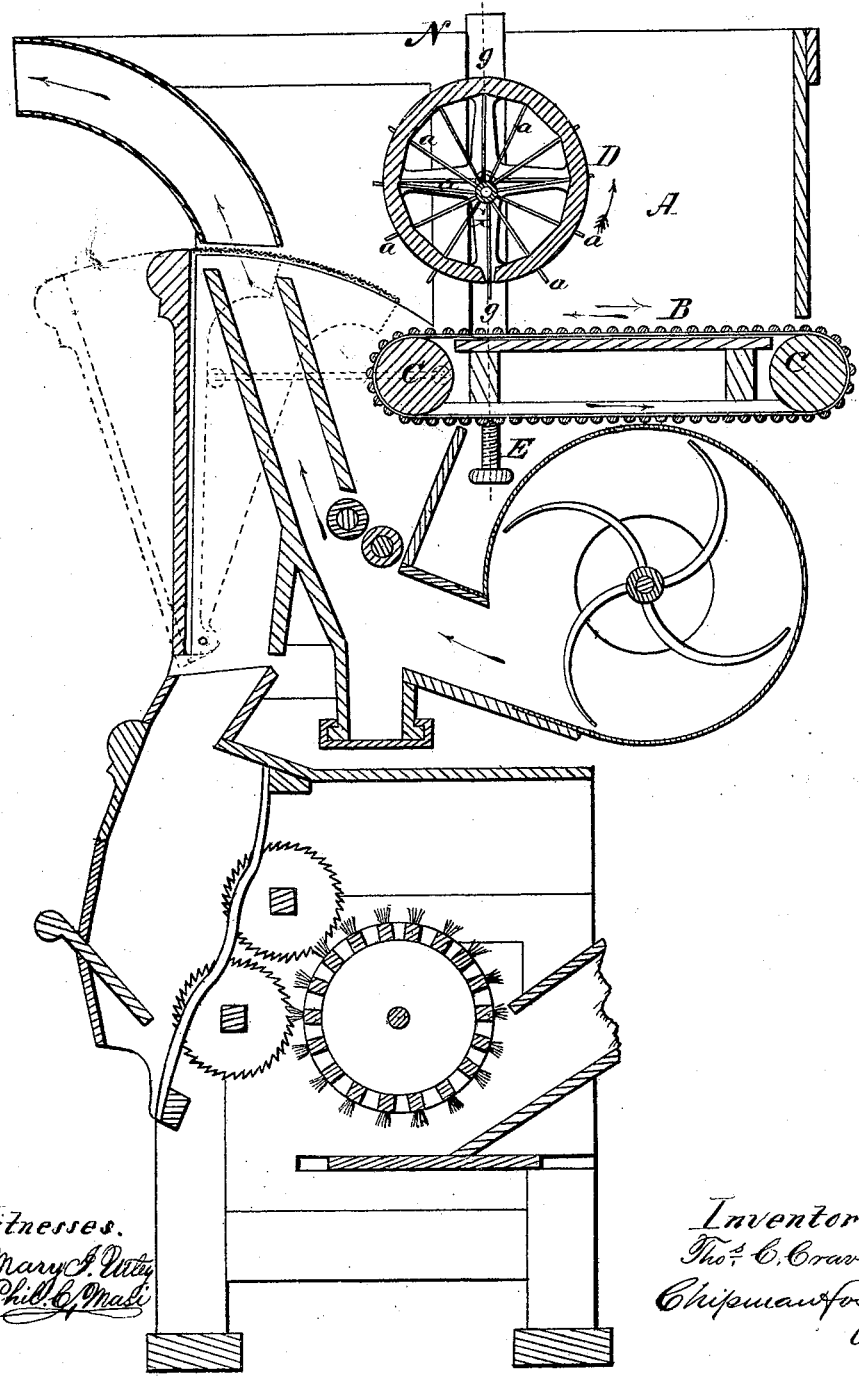

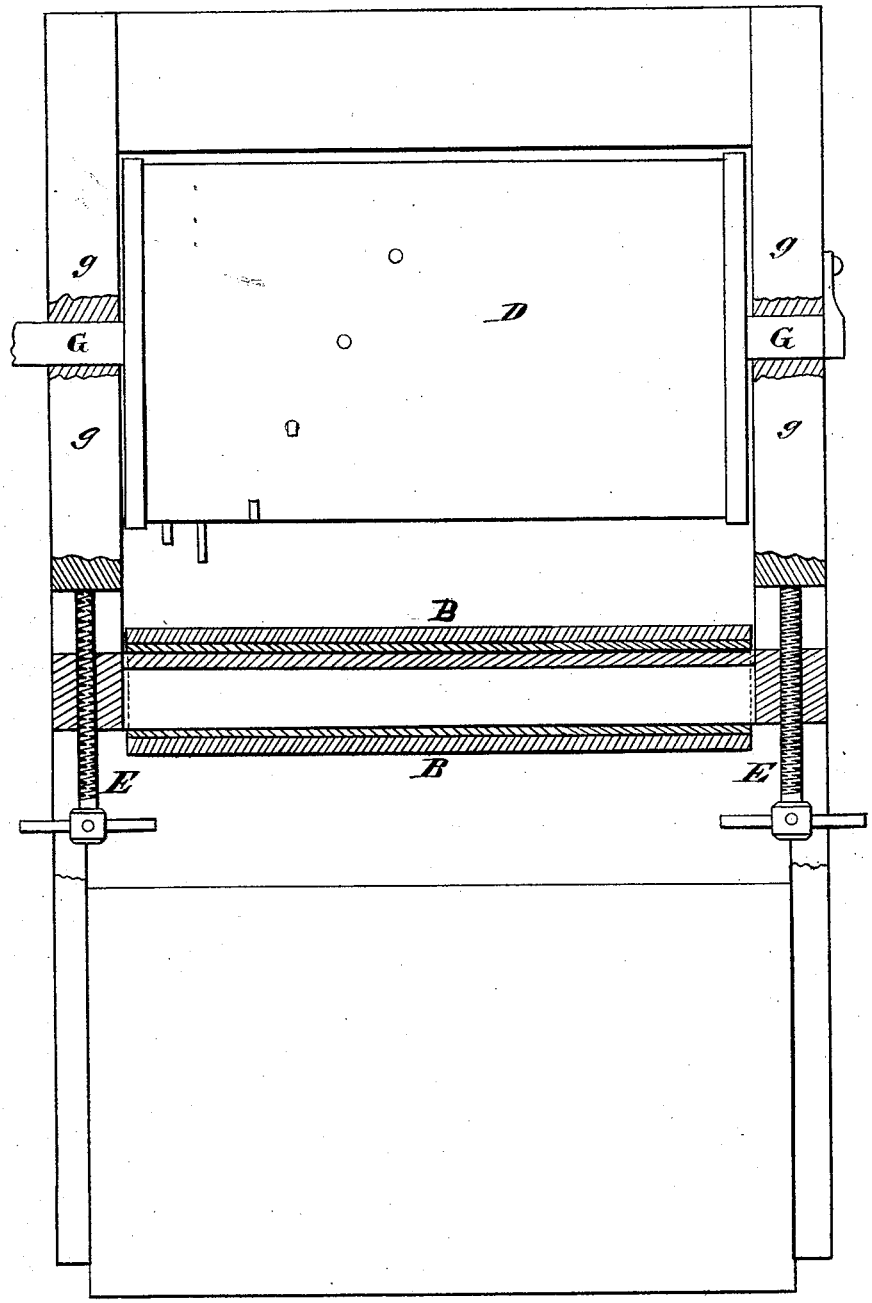

THOMAS C. CRAVEN, OF HUDSON, NEW YORK, ASSIGNOR TO GEORGE H. POWER, OF SAME PLACE.

IMPROVEMENT IN COTTON-FEEDERS FOR COTTON-GINS.

Specification forming part of Letters Patent No. 146,877, dated January 27, 1874; application filed September 20, 1873.

CASE A.

*To all whom it may concern:*

Be it known that I, THOMAS C. CRAVEN, of Hudson, in the county of Columbia and State of New York, have invented a new and valuable Improvement in Cotton-Feeders; and I do hereby declare that the following is a full, clear, and exact description of the construction and operation of the same, reference being had to the annexed drawings making a part of this specification, and to the letters and figures of reference marked thereon.

Figure 1 of the drawing is a representation of a vertical section of my cotton-feeder. Fig. 2 is a horizontal section of same.

This invention relates to improved means for feeding seed-cotton to ginning-machinery or cotton-cleaners of any description, wherein I combine adjusting-screws with a toothed evener-cylinder, which is arranged over an endless apron, which screws allow the said evener-cylinder to be adjusted and set to run nearer to or farther from the endless apron, according to the amount of feed required.

In the accompanying drawings, I have represented my improved feeder combined with blast-spouts and a vibrating screen for cleaning the cotton, which devices form the subject of an application for Letters Patent marked "Case B," and bearing even date with the filing of this, and are, consequently, not herein claimed. A represents a hopper, into which the cotton is put, having for its bottom an endless apron, B, which is applied on endless rollers C C, and which is moved in the direction indicated by the arrows. Above this apron B is arranged a toothed evener-cylinder, D, the teeth *a* of which are acted on by an eccentric within the drum, so that when this drum is revolved in the direction of the arrow in Fig. 1, the teeth or fingers protrude through its lower surface, but are withdrawn from the upper surface; consequently the cotton will not be carried around the drum.

An evener with retracting teeth or fingers applied to it, and also an endless apron, have been fully described in the schedule annexed to my Letters Patent numbered 135,528, and are not herein, broadly, claimed.

The shaft G of evener D has its bearings in vertically-movable slides *g*, which are guided in the sides of frame N, and which are supported upon the ends of adjusting-screws E; consequently, by turning these screws, the evener D can be moved up or down and the teeth or fingers set nearer to or farther from the apron B.

Instead of the apron B, I may employ a series of rollers arranged closely together for the purpose of moving the cotton beneath the toothed evener D, and, instead of arranging the screws E beneath the slides *g*, they may be applied over these slides or arranged in any other suitable manner.

It will be seen from the above description that I am enabled to feed the cotton in a uniform manner, as to quantity, in a given time, and that the quantity can be regulated to a nicety while the machine is in operation.

This invention is designed as an improvement on my patent dated February 4, 1873, No. 135,528.

What I claim as new, and desire to secure by Letters Patent, is—

The cotton-feeder, consisting of the endless feeding-apron B, in combination with a vertically-adjustable retracting-toothed evener-cylinder, D, moving in opposite direction to said apron, and adapted to be set nearer to or farther from said apron, substantially as specified.

In testimony that I claim the above I have hereunto subscribed my name in the presence of two witnesses.

THOS. C. CRAVEN.

Witnesses:
PHIL. C. MASI,
JOS. B. LOOMIS.